UNITED STATES PATENT OFFICE.

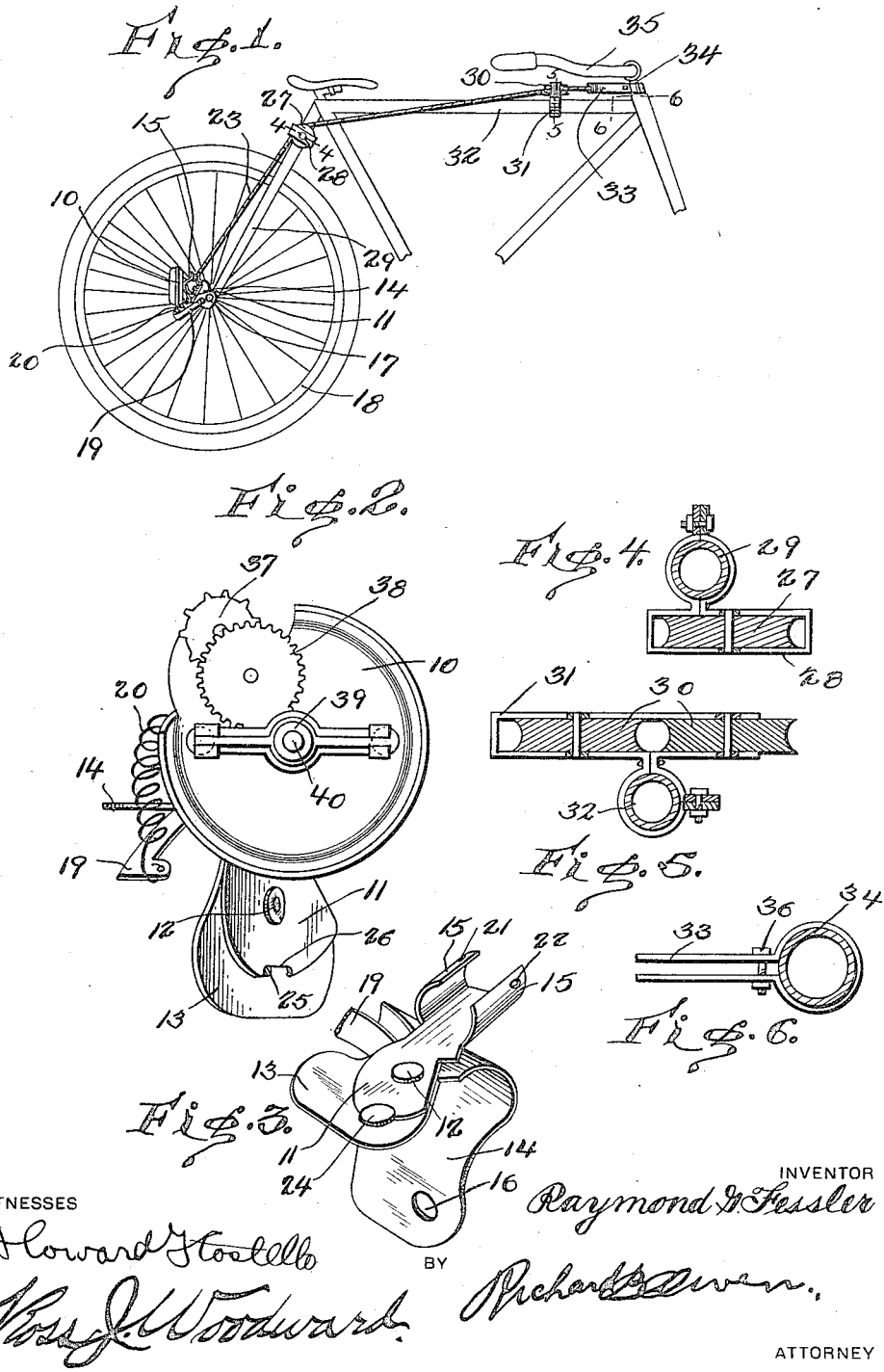

RAYMOND G. FESSLER, OF MENDOTA, ILLINOIS.

BICYCLE-BELL.

1,213,469.	Specification of Letters Patent.	Patented Jan. 23, 1917.

Application filed March 22, 1916. Serial No. 86,027.

*To all whom it may concern:*

Be it known that I, RAYMOND G. FESSLER, a citizen of the United States, residing at Mendota, in the county of La Salle and State of Illinois, have invented certain new and useful Improvements in Bicycle-Bells, of which the following is a specification.

This invention relates to an improved bicycle bell and the principal object of the invention is to provide a bell so constructed that it may be connected with the axle of the rear wheel, the actuating line for the bell being led up the rear forks and across the cross bar of the frame to the handle post. This permits the bell to be placed out of the way and at the same time permits the actuating line to be led to a point where it will be convenient to reach.

Another object of the invention is to so mount this bell that the driving gear of the ringing mechanism may be brought into engagement with the spokes of the rear wheel when it is desired to ring the bell.

Another object of the invention is to provide an improved type of supporting bracket for the bell, the bracket including a base connected with the axle of the rear wheel and a bell carrying arm pivotally connected with the base and yieldably held in a position to retain the bell out of an operative position.

Another object of the invention is to so construct this signal outfit that it may be easily put in place or transferred from one bicycle to another.

This improved device is illustrated in the accompanying drawings, wherein:—

Figure 1 is a view in side elevation of a bicycle with the signal outfit in place. Fig. 2 is a perspective view of the bell and bracket with the bell cap removed. Fig. 3 is a perspective view of the bell supporting bracket. Fig. 4 is a sectional view taken along the line 4—4 of Fig. 1. Fig. 5 is a sectional view taken along the line 5—5 of Fig. 1. Fig. 6 is a sectional view taken along the line 6—6 of Fig. 1.

The bell 10 is clamped to the pivoted arm 11 which arm is pivotally connected with the upper leaf 13 of the bracket 14 by means of rivet 12. The outer end portion of this arm 11 is provided with side wings 15 bent to provide a sleeve or cuff about which the usual clamp of the bell can be securely fastened. This bracket 14 is provided with an opening 16 through which the axle 17 of the rear wheel 18 may pass to mount the bracket and not only serves as means for pivotally mounting the bell carrying arm 11 but also provides means for mounting the arm or finger 19 with which the spring 20 is connected. The opposite end of this spring 20 is secured in the opening 21 of one of the wings 15 and serves to normally but yieldably retain the arm 11 in the position shown in Fig. 3. An opening 22 is provided in the second wing 15 with which the line 23 is connected so that when desired, the arm 11 may be drawn out of the normal position by drawing upon this line. It is necessary to limit the pivotal movement of this bell carrying arm and there has therefore been provided a rivet 24, the shank 25 of which passes through a notch 26 in the arm as shown in Fig. 2 thus limiting the swinging movement of this arm and preventing the spring as well as the line from moving the bell carrying arm beyond the desired amount.

When this device is in use, the bracket is connected with the axle of the rear wheel and the line 23 is carried upwardly over the pulley wheel 27 mounted in the frame 28 clamped to one of the rear forks 29 and is then carried between the pulley wheels 30 mounted in the frame or pulley housing 31 clamped to the cross bar 32 of the frame and is connected with the terminal bracket 33 clamped to the post 34 of the handle bars 35. This terminal bracket may be securely clamped to the post of the handle bars by means of the bolts 36 and therefore this bracket will swing with the handle bars thus drawing upon the line when making a sharp turn such as when turning a corner thereby moving the bell into an operative position and causing it to ring. Therefore there is no danger of the rider forgetting to ring the bell when turning a corner as the act of turning the handle bars will cause the bell to be swung into an operative position. When this bell moves into an operative position, the driving gear 37 will be engaged by the spokes of the rear wheel and when turned will rotate the driven gear 38 which in its turn will rotate the striker 39 mounted upon the pin 40 which holds the cap of the bell in place.

I have therefore provided a bell and actuating means which is so constructed that the bell will to a certain extent act automatically in that a sharp turn will cause the bell to be swung into an operative position and have further provided a bell so constructed and mounted that it may be manually operated by drawing upon the line. I have further provided a mounting for the bell which will be strong and durable and so constructed that it will permit the signal to be easily and readily transferred from one bicycle to another.

What is claimed is:—

1. A bicycle including a frame, a driving wheel having an axle, and a steering post, a bracket connected with the axle of said driving wheel and including a movable arm, a signal connected with said arm and including actuating mechanism engaged by said driving wheel when the arm is moved to bring the signal to an operative position, a rigid lever arm extending from said steering post above the frame, and flexible means connecting said lever arm with the movable arm of said bracket for moving the signal into an operative position when the steering post is turned.

2. A vehicle including a frame, a driving wheel and a steering post, a movably mounted signal including actuating mechanism engaged by said driving wheel when the signal is moved to an operative position, a rigid lever arm extending from said steering post above the frame, and flexible means connecting said lever arm with the signal for moving the signal into an operative position when the steering post is turned.

In testimony whereof I affix my signature in presence of two witnesses.

RAYMOND G. FESSLER.

Witnesses:
 IRVIN FESSLER, Jr.,
 MINNIE I. WORSLEY.

Copies of this patent may be obtained for five cents each, by addressing the "Commissioner of Patents, Washington, D. C."